April 10, 1945. C. T. WALTER 2,373,361
APPARATUS FOR SEPARATING LEAN MEAT FROM FAT TISSUE
Filed May 22, 1942
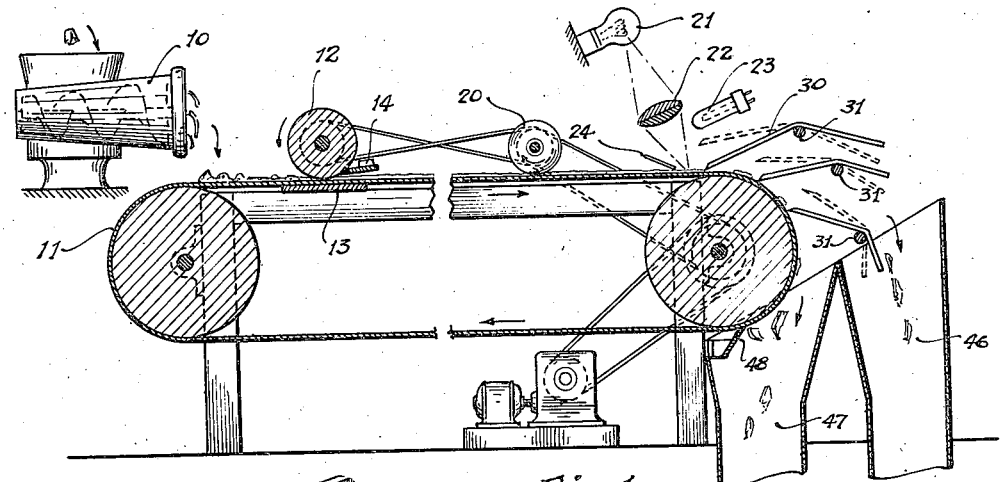
Fig.1
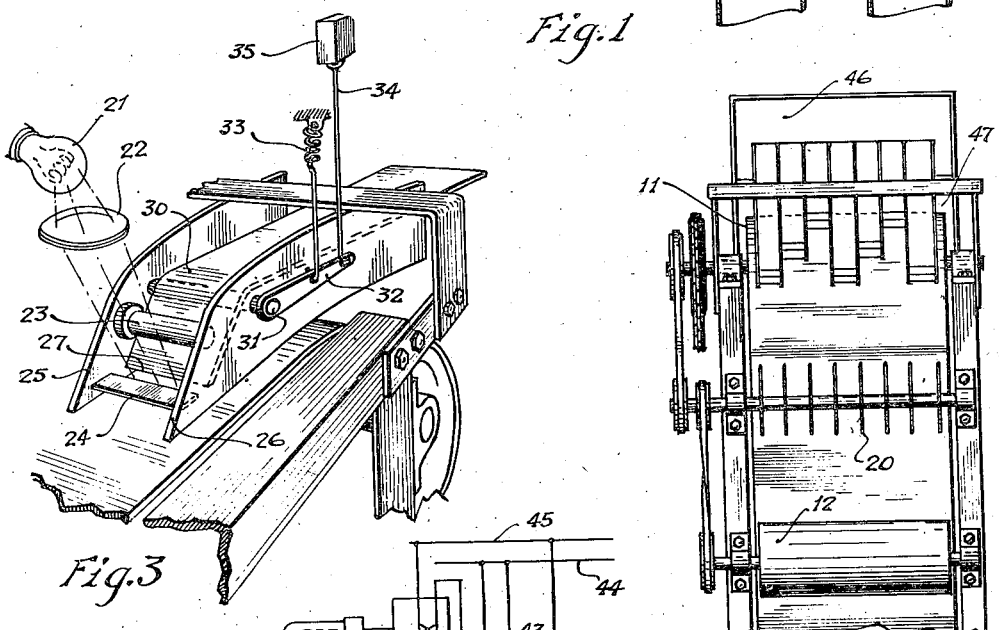
Fig.3
Fig.2
Fig.4
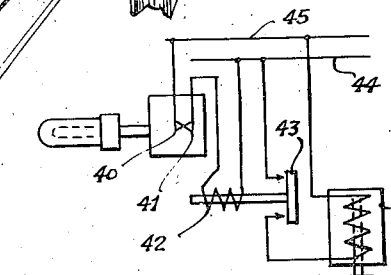
Charles T. Walter
INVENTOR
ATTEST —
BY
ATTORNEY Patented Apr. 10, 1945

2,373,361

UNITED STATES PATENT OFFICE 2,373,361

APPARATUS FOR SEPARATING LEAN MEAT FROM FAT TISSUE

Charles T. Walter, Chicago, Ill., assignor to Industrial Patents Corporation, Chicago, Ill., a corporation of Delaware Application May 22, 1942, Serial No. 444,132

6 Claims. (Cl. 209—111)

This invention relates to means for separating various ingredients or materials one from the other and more particularly, it relates to a machine designed to automatically segregate the fat from the lean portion of a meat product.

It is an object of this invention to provide a simplified construction for automatically separating one product from another.

It is another object of this invention to provide an automatic means including a photoelectric system for separating the lean portion of a meat product from the fat portion.

Other objects of the invention will appear in the description given below.

In the drawing:

Figure 1 is a sectional side elevation of a construction embodying this invention.

Figure 2 is a diagrammatic plan view partly broken away showing the disposition of the gate mechanisms.

Figure 3 is a perspective view of certain of the gate and gate operating mechanisms.

Figure 4 is a sketch of an electrical circuit controlled by the photoelectric system for effecting the operation of the gate mechanism of this invention.

The present day method of separating the fat and lean portions of a meat product is a manual process, the lean portion being merely cut away from the fat. This of course is very slow and only cheap labor can be used if a profit is to be derived. To avoid the necessity of manually separating the lean from the fat, the present invention has been provided.

Essentially the machine here shown provides means to disintegrate the product being treated and the disintegrated product is then deposited on a conveyor, whereupon it is flattened to a relatively thin layer. The flattened disintegrated product is then passed under photoelectric scanning means which controls a gate mechanism cooperating with the conveyor means, upon which the disintegrated product has been disposed, to effect a separation of and delivery of the fat or lean into suitable receiving means.

In classifying or separating products like the fat from a lean particle of meat, it has been found, if the area of the product is controlled and also if the layer of disintegrated material, exposed to the scanning means and being selectively removed is sufficiently thin, that an effective separation of the fat and lean can be accomplished. It should be noted that, as the product to be classified has been divided and flattened into a relatively thin layer, the layer may be visualized as being made up of little homogeneous islands of lean meat in fat or vice versa. Theoretically then, if the unit area exposed to the photoelectric cell could be made small enough, a perfect separation could be accomplished, that is, if a single little island of lean could be scanned and separated, only fat would remain. The present invention provides means for practically reaching this optimum condition and thus an efficient separation of fat from the lean results.

While the present description will show how, in a meat product, lean particles and fat particles may be separated automatically by mechanical means, it is to be understood that any product substantially similar in its physical properties, may be successfully separated upon being subjected to the herein disclosed method and means for classification.

Referring to the drawing, if a meat product is to be treated which consists of various proportions of fat and lean, the product may be delivered into the grinder or disintegrating means 10, of conventional construction, which cuts the product into relatively large or coarse particles. The ground meat products drop from the grinder onto a conveying means such as an endless belt 11 mounted on suitable roller supports carried in the frame of the machine. The belt is driven in the direction of the arrows, Figure 1, and carries the disintegrated product deposited on its upper surface under means to spread the particles over the belt in a thin layer. Because of the sticky nature of the fat and lean constituents of the meat product a flattening roller 12 may be used to mash the particles into a thin layer. The flattening roller pushing through the product, presses the conveyor belt 11 against the pressure shoe 13 so that the disintegrated particles on the surface of the conveyor may be flattened to any predetermined thickness and a scraping means 14 is disposed to cooperate with the surface of the flattening roller 12 to strip the layer of disintegrated products from the roller.

The disintegrated layer of the product is then carried on the conveyor under the dividing means 20 to sever the flattened mass into a series of ribbons disposed longitudinally of the conveyor means. Any device suitable for use with the particular product being classified may be used and for meat products the dividing means may comprise a series of rotating knives which bear against the relatively tough surface of the conveyor belt to sever the soft meat product into ribbons. In practice, the ribbons may be onehalf to one inch in width and good results may be obtained with even larger width ribbons depending upon the type of meat product being treated.

The material after being divided into ribbons is then carried by the conveyor under photoelectric scanning means which selectively actuate suitable stripping devices cooperating with the conveyor to remove certain portions of the flattened ribbons from the conveyor belt to be delivered into suitable receptacles. A separate scanning and stripping system is preferably provided to complete a classification of each ribbon.

The photoelectric scanning system positioned over any one ribbon includes a light source 21 and a lens 22 for directing the beam of light onto the ribbon of material and the light is reflected from the ribbon into the photoelectric cell 23. An opaque mask 24 may be provided which cooperates with the walls 25 and 26, and the edge 27 to control the area of the ribbon exposed to the photoelectric scanning system and preferably the mask may be made adjustable to vary the area being exposed. The ribbon flows under the scanning system between the side walls 25 and 26 in which the mask 24 may be slidably mounted so that any pre-selected area of the flattened product may be exposed to the light beam and thus the efficiency of selection or classification is controlled. It is seen that with this construction, the walls 25 and 26 being fixed, the mask 24 may be shifted inwardly or outwardly to select any desired area for exposure to the scanning system.

As above stated, a photoelectric scanning system is disposed over each ribbon of the material formed at the dividing means 20 and while it is conceivable that a single ribbon could be deposited upon the conveyor belt 11, in order to increase the output of the machine a relatively wide belt is used and a plurality of ribbons are simultaneously conveyed into a plurality of scanning and selective devices. The width of the ribbon is determined by the character of the product being scanned and should be of such width that in cooperation with the opaque mask 24, a convenient rectangular area be exposed, the area being of such size that efficient classification can be performed as taught above.

Each of the photoelectric scanning systems controls the operation of a pivotally mounted gate 30 disposed above the conveyor belt, the gate 30 having the forward scraping edge 27 for contacting the conveyor to remove the disintegrated and flattened product from the belt when it is in contact therewith. The gate 30 may be pivotally mounted between the walls 25 and 26 on a rotatable axle 31 which may extend through the wall 26 to have an arm 32 fixedly secured thereto. A compression spring 33 fixedly mounted over the arm 32 engages it intermediate its length to normally urge the arm 32 downwardly as shown in Figure 3, to rotate axle 31 to lift the forward scraping edge 27 of the gate off of the conveyor. Pivotally connected to the outer end of the arm 32 is a tension rod 34 which is operatively associated with the solenoid 35, the energization of the solenoid being controlled by the photoelectric scanning system. When the solenoid 35 is energized, the link 34 is lifted against the force of the spring 33 so that the forward end of the gate 30 is moved downwardly until edge 27 scrapes against the conveyor surface to strip the ribbon off the belt.

The solenoid 35 functions when the photoelectric cell detects a variation in the amount of reflected light coming from the conveyor and in the meat product here described as being classified, the fat portion has a lighter shade than the lean portion. Thus more light will be reflected from the fat portion than will be reflected from the lean and when the amount of light increases the photoelectric cell is energized. The current generated in the photoelectric cell is conducted to a conventional amplifier unit which in turn, depending on the amount of generated current fed to the amplifier, selectively actuates means for making a circuit through contacts 40 and 41 to establish a circuit through the solenoid 42 causing the switch 43 to be drawn to the left as shown in Figure 4. When switch 43 bridges its contacts, a circuit is made from the power supply lines 44 and 45 through the solenoid 35 to effect the desired operation of the gate from its position out of contact with the conveyor to its position in contact therewith to cause the ribbon to be scraped from the conveyor. As long as the color of the layer passing under the photoelectric cell continues to be uniform in degree the condition of the cell remains constant and the gate will be held in one position or the other.

It should be noted that the forward edge 27 of each gate engages the conveyor immediately adjacent the area being scanned and in fact forms one boundary of the area. The gate may be driven into contact with the conveyor to strip off areas of lean or fat and the amplifier unit may be constructed to make or break the contacts 40 and 41 as either operation is desired. If the amplifier is arranged to close contacts 40 and 41 when a predominately lean area is being scanned, the edge 27 will lift the lean area off the conveyor to be delivered over the gate into the hopper 46.

If a predominately fat area flows into position to be scanned, the condition of the photoelectric cell is changed and the amplifier, which has been designed and set to be sensitive to variations in current flowing from the cell, causes the contacts 40 and 41 to be separated. This opens the circuit through solenoid 42 releasing switch 43 and breaking the circuit through solenoid 35. The tension arm 34 is then released whereupon spring 33 drives the arm downwardly to lift edge 27 of the conveyor. The fat area having thus effected an operation to lift the edge 27 out of its path, is carried on by the conveyor to be deposited in the hopper 47. The fixed scraper 48 may be provided to strip the fat from the conveyor 11 as needed.

Each ribbon formed on the conveyor is similarly treated and the individual scanning devices and stripping means operate entirely independently one from the other to simultaneously classify the product carried along by the conveyor.

In order to fit a large number of gates into a specified width of belt it may be necessary to offset the gates as shown in Figure 2 but in each case the operation of the gate structure is exactly as outlined above.

It will be seen that as the particles are delivered to the conveyor, they may be spread over the surface thereof if necessary and the distributed particles are then divided into suitable ribbons. The ribbons of particles are then subjected to the scanning means here shown which function through well known means to operate the gate mechanism for selectively separating one portion of the product from the other portion depending upon variations in color between the portions. One of the constituents of the ribbon will be delivered over the gate and into the hopper 46 and the product remaining on the belt will be carried by the conveyor into the hopper 47.

While this invention has been described in connection with the separation of a fat portion from a lean portion of a meat product, it is obvious that other similar mixtures of materials may be subjected to the separating apparatus here disclosed for the efficient classification of the ingredients. The essential feature of this construction resides in providing a relatively thin layer of substantially homogeneous nature throughout its thickness and in then dividing the layer of material into a small enough area whereby when it is scanned, the composition of the product within that area will be uniform or predominately the same.

The above description covers one device for performing this invention. Many modifications may occur to those skilled in the art, all of which are comprehended to be within the scope of the following claims.

I claim:

1. In a machine for separating the darker colored lean portion from the lighter colored fat portion of a meat product and the like comprising means to disintegrate the product, conveyor means to receive the disintegrated product, a flattening roller disposed above said conveyor for mashing the particles of the disintegrated product to distribute the material in a uniform layer on the conveyor, photoelectric means for scanning the layer of the disintegrated product on the conveyor means, gate means movable between predetermined positions and cooperating with the conveyor to cause the removal of a portion of the disintegrated product from the conveyor means, said gate means being effective to direct said portion of the product into receiving means, and means including an electrical relay circuit responsive to said photoelectric means for actuating said gate into one or the other of said positions until the condition of said photoelectric means is changed.

2. In a machine for separating the darker colored lean portion from the lighter colored fat portion of a meat product and the like comprising means to disintegrate the product, a relatively wide endless conveyor belt to receive the disintegrated product, separating means cooperating with said belt to divide the particles carried thereby into ribbons, photoelectric means for scanning each of the ribbons of disintegrated product on the conveyor means, gate means movable between predetermined positions and cooperating with the conveyor to cause the removal of a portion of the disintegrated product in each of said ribbons from the conveyor means, said gate means being effective to direct said portion of the product into receiving means, and means including an electrical relay circuit responsive to said photoelectric means for actuating said gate between said positions.

3. In a machine for separating the darker colored lean portion from the lighter colored fat portion of a meat product and the like comprising means to disintegrate the product, a conveyor means to receive the disintegrated product, a flattening roller disposed over the conveyor to mash the particles into an even layer on said belt, dividing means cooperating with said conveyor to separate the layer of particles into ribbons disposed longitudinally of the conveyor, photoelectric means for scanning each of the ribbons of disintegrated product on the conveyor means, gate means movable between predetermined positions and cooperating with the conveyor to cause the removal of a portion of each of the ribbons of the disintegrated product from the conveyor means, said gate being effective to direct said portion of the product into receiving means, and means including an electrical relay circuit responsive to said photoelectric means for actuating said gate between said positions.

4. In a machine for separating the darker colored lean portion from the lighter colored fat portion of a meat product and the like comprising means to disintegrate the product, conveyor means to receive the disintegrated product, photoelectric means for scanning the disintegrated product on the conveyor means, gate means movable between predetermined positions and cooperating with the conveyor to cause the removal of a portion of the disintegrated product from the conveyor means, said gate being effective to direct the product into receiving means, said gate means including a vane pivotally mounted above said conveyor means and having an edge for engaging the conveyor to scrape said portion of the particles off of said conveyor, and means including an electrical relay circuit responsive to said photoelectric means for actuating said gate into one or the other of said positions until the condition of said photoelectric means is changed.

5. In a machine for separating the darker colored lean portion from the lighter colored fat portion of a meat product and the like comprising means to disintegrate the product, a relatively wide conveyor means to receive the disintegrated product, separating means cooperating with said belt to divide the particles carried thereby into a plurality of ribbons, photoelectric means for scanning the disintegrated product on the conveyor means, a plurality of gate means cooperating with the conveyor, there being one of said gate means for each of said ribbons, said gate means being movable between predetermined positions with respect to the conveyor means to cause the removal of a portion of the disintegrated product from the conveyor means, said gate means being effective to direct said portion of the product into receiving means, and means including an electrical relay circuit responsive to said photoelectric means for actuating said gate between said positions.

6. In a machine for separating the darker colored lean portion from the lighter colored fat portion of a meat product and the like comprising means to disintegrate the product, a conveyor means to receive the disintegrated product, a flattening roller disposed over the belt to mash the particles into a uniform layer, dividing means cooperating with said belt to separate the layer of particles into a plurality of ribbons disposed longitudinally of the conveyor belt, photoelectric means for scanning said ribbons of disintegrated product, a plurality of gate means cooperating with the conveyor, there being one of said gate means for each of said ribbons, said gate means being movable between predetermined positions with respect to the conveyor means to cause the removal of a portion of the disintegrated product from the conveyor means said gate means being effective to direct the product into receiving means, and means including an electrical relay circuit responsive to said photoelectric means for actuating said gate between said positions.

CHARLES T. WALTER.